United States Patent [19]
Luders

[11] 3,727,656
[45] Apr. 17, 1973

[54] GRAIN STORAGE

[76] Inventor: David John Luders, 81 Sampson Street, Orange, Australia

[22] Filed: Sept. 15, 1970

[21] Appl. No.: 68,369

[30] Foreign Application Priority Data

Sept. 19, 1969 Australia...........................61083/69

[52] U.S. Cl. ...............................150/1, 52/3, 52/63, 135/8, 150/.5
[51] Int. Cl. ...............................................B65d 1/00
[58] Field of Search ...........................150/.5, 1; 52/3, 52/63; 135/8

[56] References Cited

UNITED STATES PATENTS 2,730,150   1/1956   Wunderwald et al. .................150/.5
3,105,617   10/1963   Felldin ..................................150/.5

Primary Examiner—Samuel B. Rothberg
Assistant Examiner—Stephen P. Garbe
Attorney—Angus and Mon

[57] ABSTRACT

A grain or other discrete form material storage device formed from a foldable (flexible) synthetic plastics sheet material. The storage device has a base which would normally rest upon the ground and a peripheral side wall which tapers upwardly to an access opening at the apex of the wall. The wall is disposed at an angle to the base, when the device is charged with stored material, which is approximately equal to the normal angle of repose of the stored material.

6 Claims, 3 Drawing Figures

GRAIN STORAGE

This invention relates to storage of granular or other discrete material and, in particular, to a light weight, portable storage device within which a quantity of grain may be temporarily stored without the need for erecting a rigid supporting structure.

The invention, as hereinafter defined, has particular application for on-site storage of grain (following harvesting and prior to marketing or delivery of the grain) when, for example, the grain is produced in amount exceeding the immediate demand. A further application of the invention is in stockpiling of granular or other discrete form materials. The above expression "temporarily stored" is to be read in this context.

There is provided in accordance with the present invention a storage device defined by a base and a side wall or walls of a flexible water impervious sheet material, the wall or walls extending upwardly and inwardly from the base at an angle substantially equal to the normal angle of repose of a material to be stored in the device, and an access opening at the apex of the device through which the material may be delivered to charge the device.

By "angle of repose" is meant that surface angle, sometimes referred to s flow-angle, which a granular or discrete particle form material will naturally assume when deposited in an unconfined pile or heap. This angle for wheat grain is in the region of 27°, although it may vary slightly with change in moisture content or surface dryness of the grain.

Also, by "flexible plastics sheet material" is meant a material which may collapse or fold upon itself when unsupported.

For convenience of manufacture the device preferably comprises a square base and triangular walls, it assuming an approximately pyramidal shape when charged. However it may equally comprise, for example, a circular base and a generally conical wall or an oblate base with side and end walls.

The invention will be more fully understood from the following description of a preferred embodiment thereof, taken in conjunction with the accompanying drawings wherein.

Figure 1:
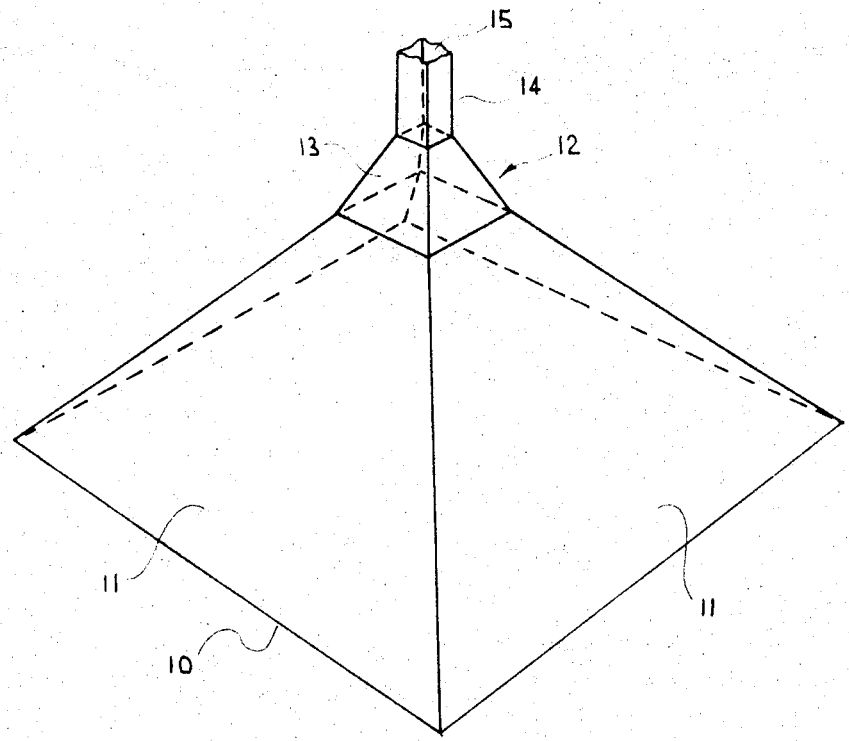
FIG. 1 is a diagramatic perspective view of the device in a charged condition.

As illustrated, the device is defined by a square base 10, four generally triangular-shaped side walls 11, a truncated pyramidal collar 12 having four walls 13, and an access neck 14 bordering a generally square filling opening 15.

The lower edges of the walls 11 are joined to the periphery of the base 10 by an adhesive or by heat sealing, although the walls might be formed integral with the base by appropriately shaping a single sheet of material. The collar and side walls (13,11) are also joined one to another by an adhesive or by heat sealing, as is the neck 14 to the collar 12. A hermetic seal is made along each joint.

The side walls 11 make an angle with the base 10 which is approximately equal to the angle of repose of a material to be stored, when the device assumes its charged or inflated shape.

The collar walls 13 are disposed with respect to the base at an angle which is significantly greater (for example, 10° to 40° greater) than the angle of repose of the material.

The collar 12 is provided as an integral part of the device to permit the material and entrained air to creep under the side walls 11, during commencement of charging and whilst the side walls are (initially) spread or resting on the base 10.

Provision of the collar 12 tends to prevent or, at least, diminish the possibility of the material from piling within the neck area and from blocking entry of further material. The collar 12 also tends to reduce the outward pressure of inflowing material on the neck joint during initial charging.

The entire device is fabricated from a flexible plastics material such as polythene, polypropylene or nylon sheeting, which can be folded into a compact package when empty. A typical material is 0.008 inch thick polythene sheeting marketed under the I.C.I trade mark Visqueen.

Due to the fact that the walls 11 of the device extend upwards at approximately the angle of repose of the material with which it is charged, little or no outward force is applied to the side walls to cause their tearing or rupturing:

A typical device, for storage of 1,000 bushels of wheat, would have a base 27 feet square and side walls having an inclined length of 12 feet. The collar would then have a 5½ feet square base and an inclined wall length of 3 feet. The neck is 1¼ feet square by 15 feet long. Such dimensions provide an angle of approximately 27° between the base and the side walls and an angle of approximately 20° between the side and collar walls.

However it will be appreciated that the size and shape of the device may be varied to meet specific requirement, provided that the angle between the side walls and the base be approximately equal to the angle of repose of a material which it is to receive.

The device is characterized by its light weight. It is portable and, when empty, may be folded-up, transported and stored with little required storage space. It is convenient to handle and is not subject to any significant deterioration either when in use or in storage. Any tears which appear may be readily patched or sealed.

Figure 2:
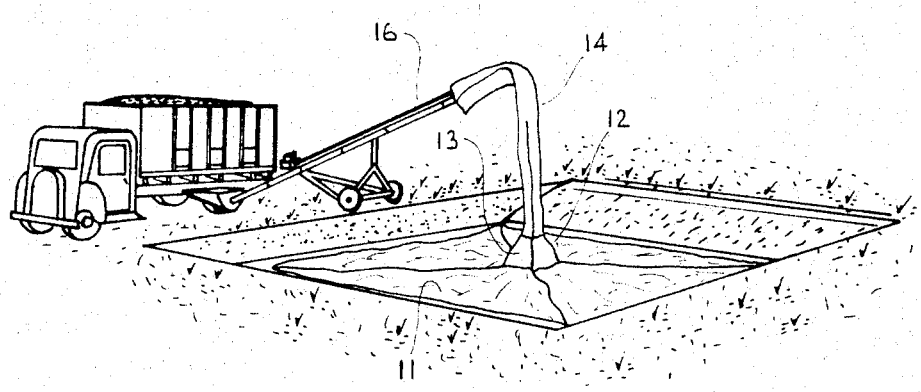
FIG. 2 is an illustration of the device, in an uncharged condition; located within a ground excavation and connected with a feed auger for filling.

In charging the device it would normally (although not necessarily) be first spread out in a pre-excavated wall, as illustrated in FIG. 2, with the neck connected with a feed auger 16 and the collar 12 lifted upwardly away from the base 10. The free end of the auger feed should be located above the center point of the base 10.

Figure 3:
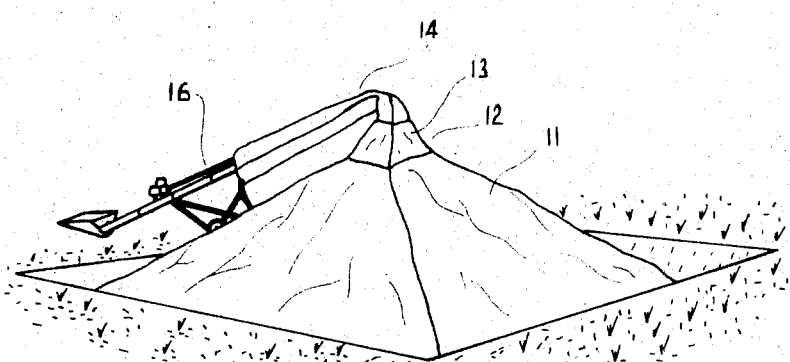
FIG. 3 is a similar view of the device when in its charged condition.

On charging to the condition shown in FIG. 3, that is, to the level of the junction of the filling neck with the collar, the neck is closed and the device is covered with the pre-excavated earth to form a mound.

The neck may be closed by knotting, taping, tying, wax-sealing or any other suitable method.

The stored grain, or other material, is thereby protected from external dampness, vermin, rodents or ambient conditions.

The device therefore avoids the necessity for permanent silo constructions and, by its portability, accomodates wide variations in primary producer outputs from one season to another.

To empty the device, stored material may be augered or sucked out through the access neck, or be similarly withdrawn through a puncture made in the side wall.

I claim:

1. A storage device defined by a base, a side wall and a collar, all being formed of a flexible water impervious sheet material, the wall extending upwardly and inwardly from the base at an angle substantially equal to the normal angle of repose of a material to be stored in the device, when the material is so stored, the collar extending upwardly and inwardly from the wall at an angle with respect to the base which is greater than the normal angle or repose of the material, and an access opening extending through the collar at the apex of the device through which the material is delivered to charge the device.

2. A storage device as claimed in claim 1 wherein the sheet material comprises a synthetic plastics material.

3. A storage device as claimed in claim 1 wherein the base is of square configuration, the side all comprises four interconnected triangular-shaped panels, and the wall has a truncated pyramidal shape when supported.

4. A storage device as claimed in claim 1 wherein the access opening is bordered by a neck formed of a flexible plastics sheet material.

5. A storage device as claimed in claim 1 wherein the side wall extends upwardly from the periphery of the base at an angle of approximately 27° and the collar wall is disposed at an angle of between 35° to 70° with respect to the base.

6. A storage device according to claim 4 in which the portion of the neck adjacent the collar has sides which extend vertically upward when charged with grain.

* * * * *